Figure 10:
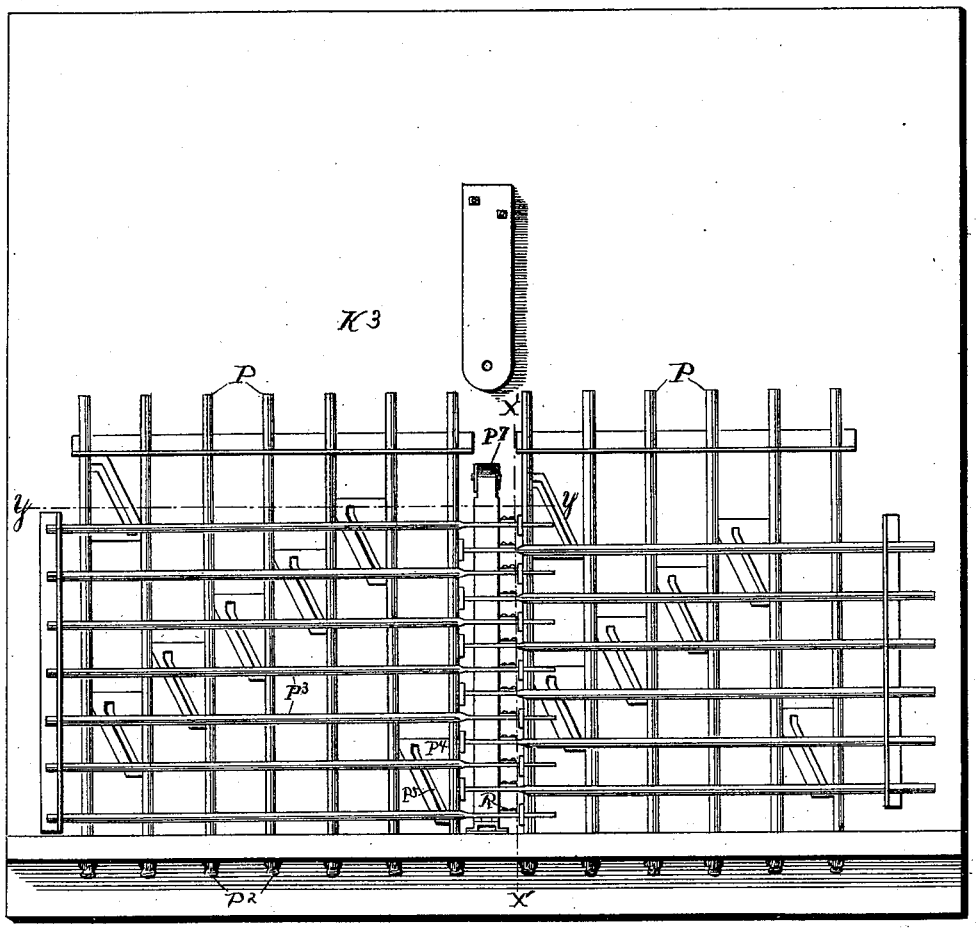

(No Model.) 6 Sheets—Sheet 1.
H. LINTON.
KITCHEN CABINET.
No. 565,477. Patented Aug. 11, 1896.
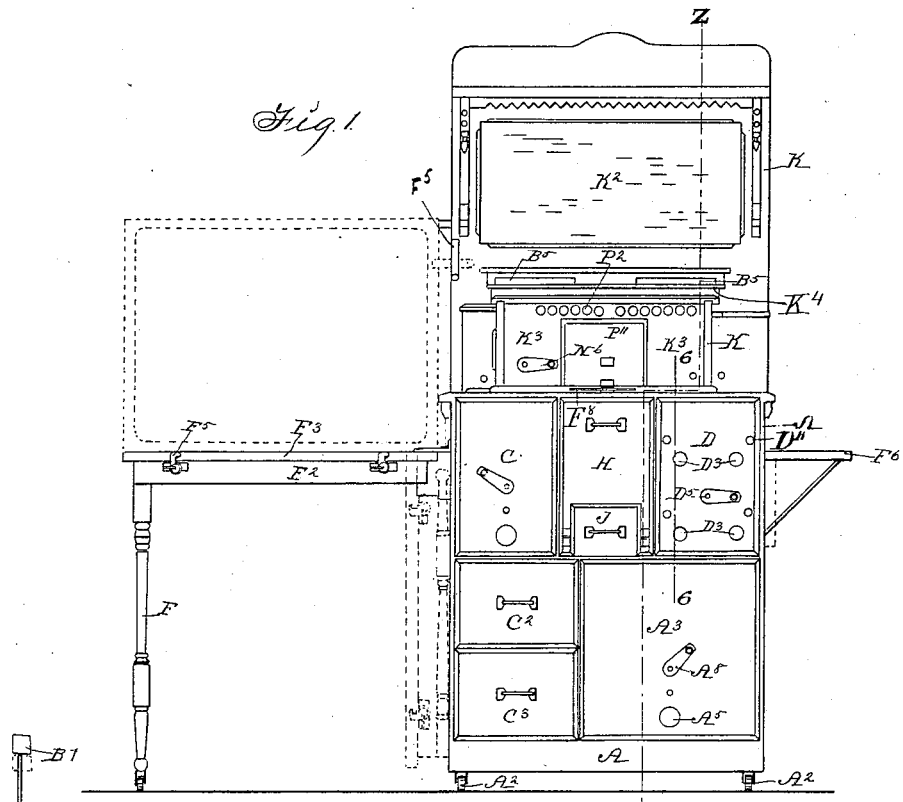
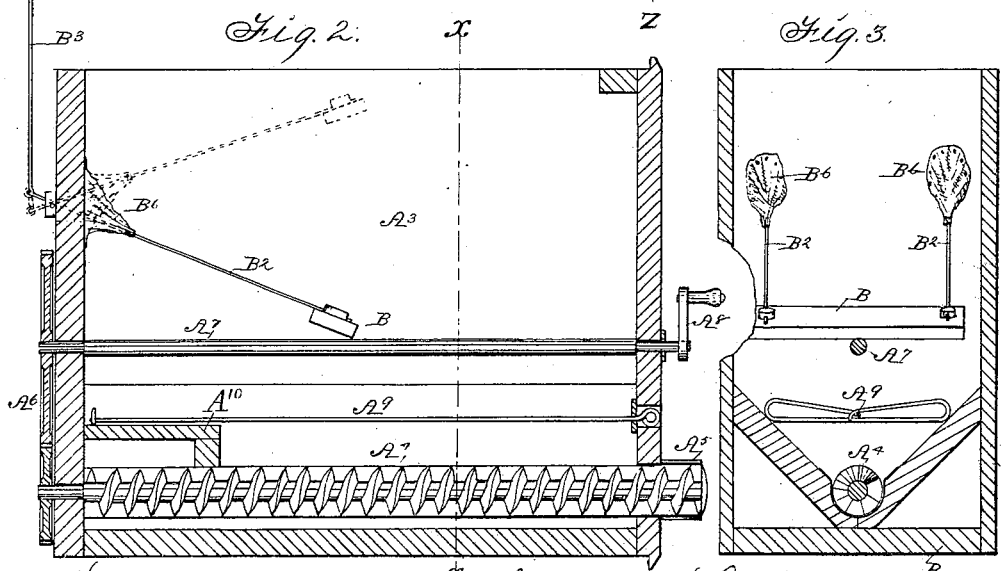
Witnesses: W. A. Ballard. J. Ralph Orwig.
Inventor: Harrison Linton,
By Thomas C. Orwig, Attorney.

(No Model.)  6 Sheets—Sheet 2.
H. LINTON.
KITCHEN CABINET.
No. 565,477.  Patented Aug. 11, 1896.
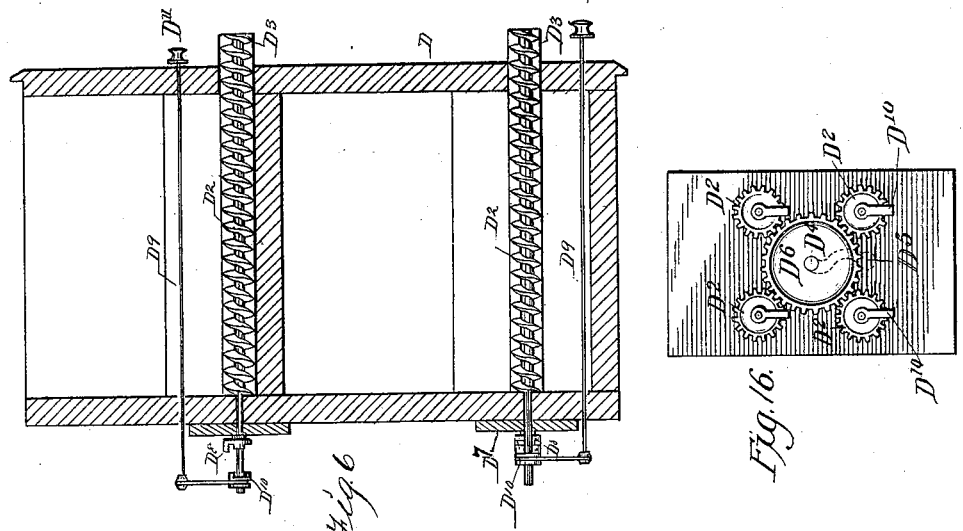
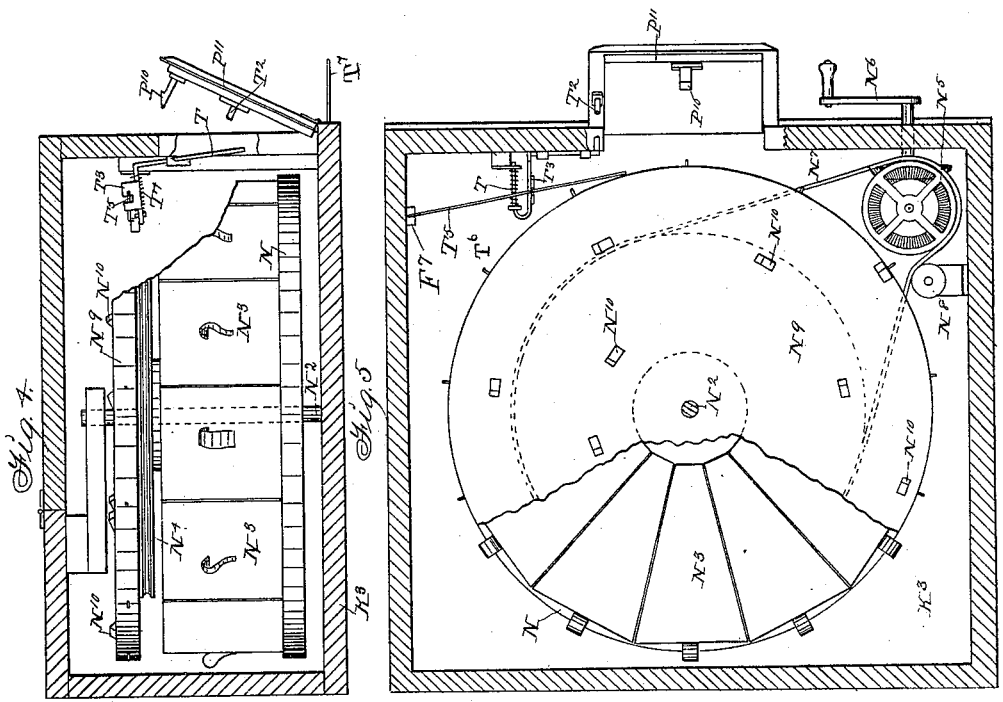
Witnesses:
R. H. Orwig
J. Ralph Orwig
Inventor: Harrison Linton,
By Thomas G. Orwig, Attorney.

(No Model.) 6 Sheets—Sheet 3.
H. LINTON.
KITCHEN CABINET.
No. 565,477. Patented Aug. 11, 1896.
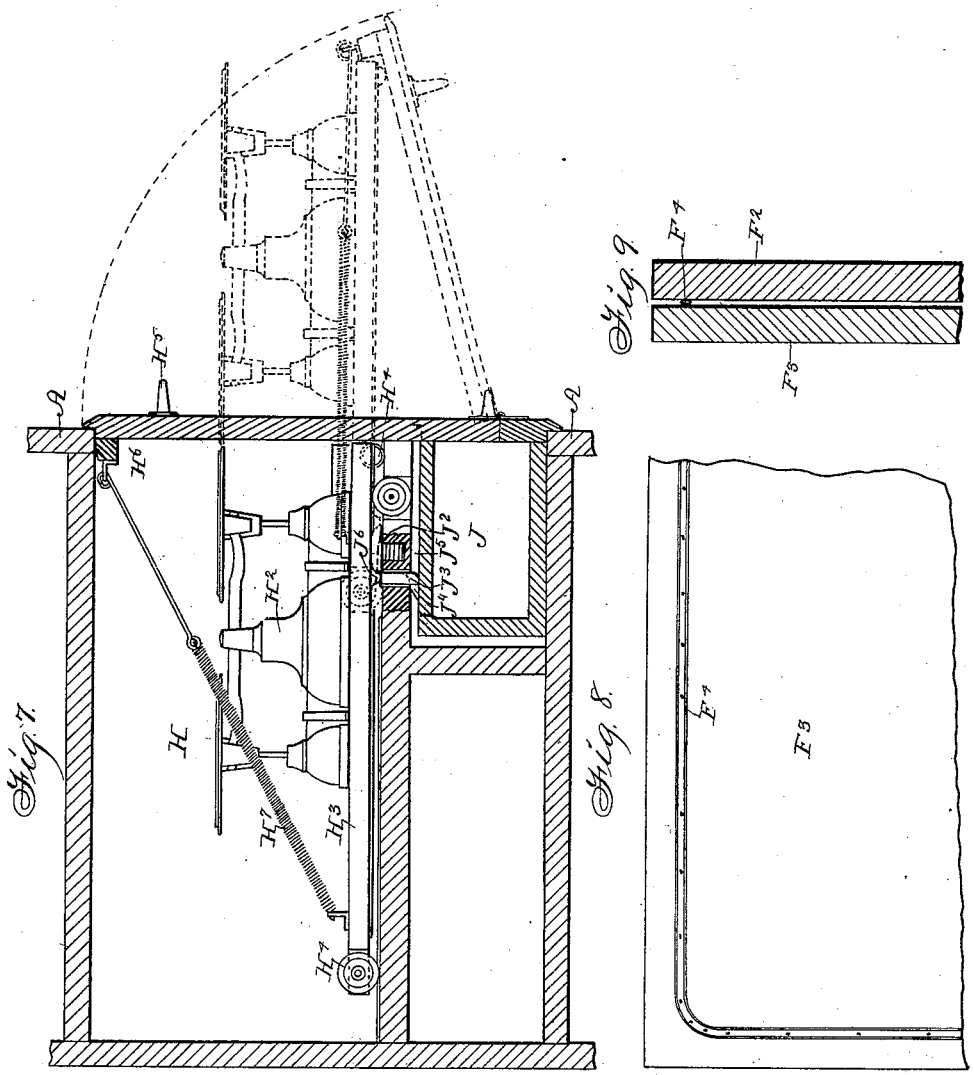

(No Model.) 6 Sheets—Sheet 4.
H. LINTON.
KITCHEN CABINET.

No. 565,477. Patented Aug. 11, 1896.

(No Model.) 6 Sheets—Sheet 5.
H. LINTON.
KITCHEN CABINET.
No. 565,477. Patented Aug. 11, 1896.
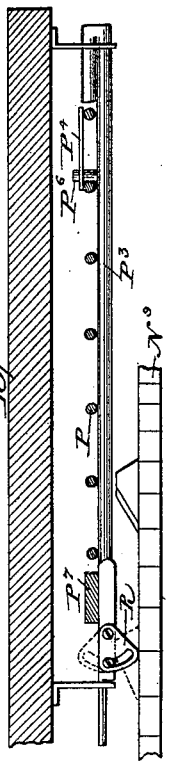
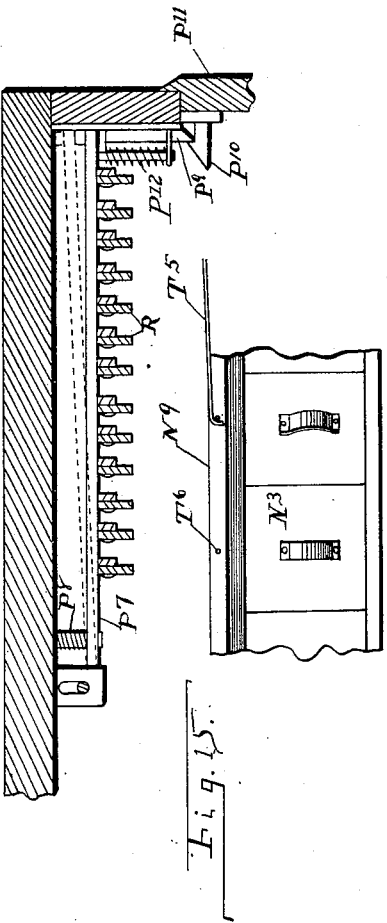
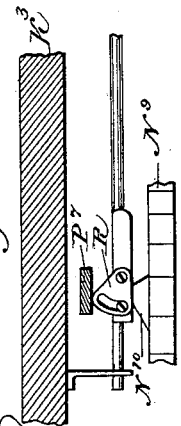

(No Model.) 6 Sheets—Sheet 6.

H. LINTON.
KITCHEN CABINET.

No. 565,477. Patented Aug. 11, 1896.

Witnesses: R.G. Orwig, W.J. Sankey

Inventor: Harrison Linton, By Thomas G. Orwig, Attorney.

UNITED STATES PATENT OFFICE.

HARRISON LINTON, OF DES MOINES, IOWA.

KITCHEN-CABINET.

SPECIFICATION forming part of Letters Patent No. 565,477, dated August 11, 1896.

Application filed April 9, 1895. Serial No. 545,118. (No model.)

*To all whom it may concern:*

Be it known that I, HARRISON LINTON, a citizen of the United States of America, residing at Des Moines, in the county of Polk and State of Iowa, have invented an Improved Kitchen-Cabinet, of which the following is a specification.

The objects of my invention are, first, to provide a device adapted to contain most of the articles used in a kitchen for cooking purposes, &c., within a small space and to provide convenient access thereto.

A further object is to provide simple, durable, and easily-operated means whereby the loose substances contained in the boxes of the cabinet may be drawn therefrom in a regular and uniform manner and a number of the said boxes connected so that one lever may be made to operate any one of them by the movement of a rod at the front of the cabinet.

A further object is to provide mechanism adapted to automatically indicate the amount of substance contained in certain of the boxes of the cabinet without opening each box successively.

A further object is to provide a scale that is automatically drawn out when a door in the front of the cabinet is opened and automatically replaced when the same is closed.

A further object is to provide a number of small boxes for spices or the like to be arranged in the top portion of the cabinet in such a manner that upon pressing a certain knob corresponding to one of the boxes and operating a crank said box will be automatically brought into coincidence with a door in the front of the device that is also automatically opened to allow the box to be taken out.

With these objects in view my invention consists in the arrangement and combination of the complete device and in certain details in the construction, arrangement, and combination of various parts of the device, as hereinafter set forth, pointed out in my claims, and illustrated in the accompanying drawings, in which—

Figure 14:
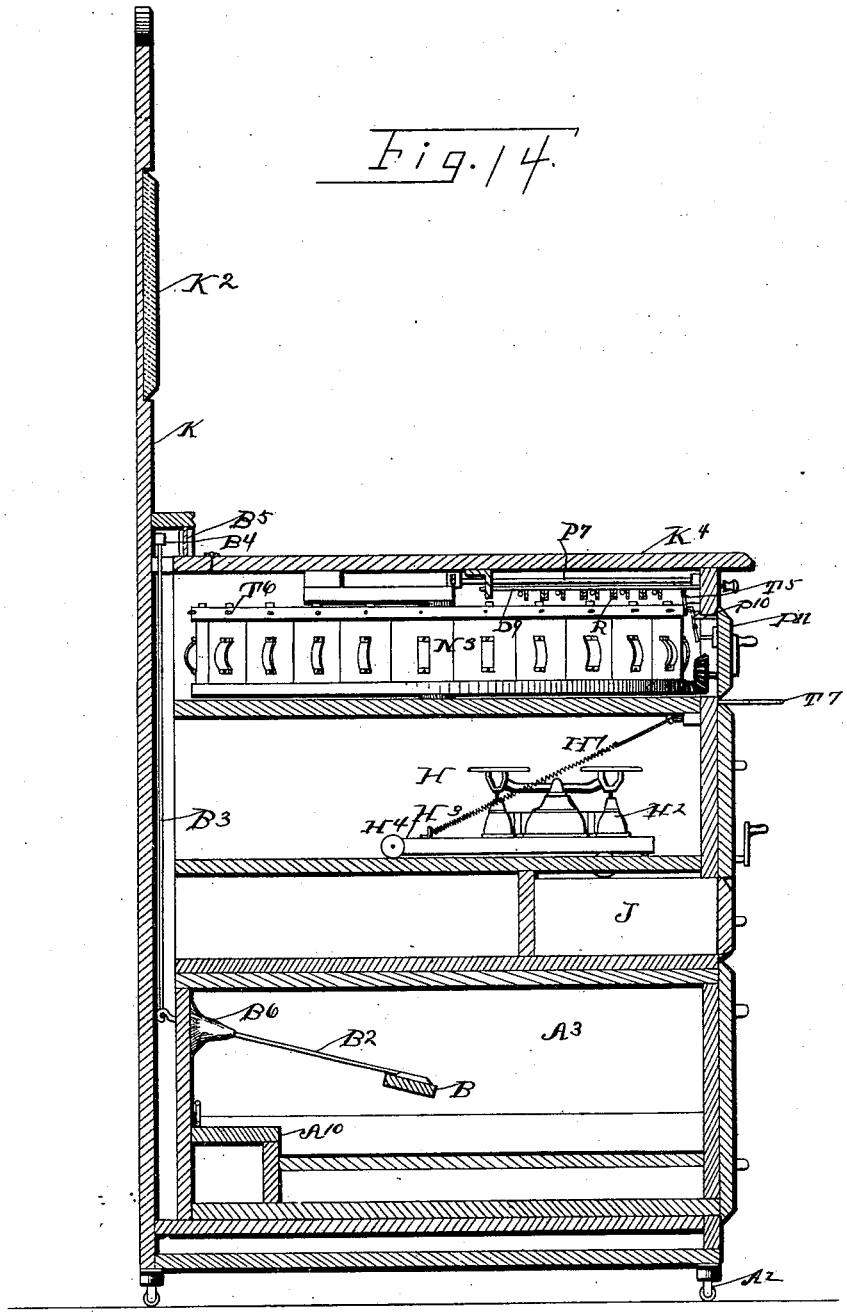

Figure 1 is a front elevation of the complete cabinet. Fig. 2 is a vertical sectional view of one of the boxes for containing flour or the like, showing the means for drawing out the flour, the device for indicating the amount of flour therein, and the scraper for cleaning the bottom of the box. Fig. 3 is a transverse sectional view through the line $x\ x$ of Fig. 2. Fig. 4 is a vertical sectional view of the boxes at the top of the device for containing spices, &c., the mechanism for automatically opening the boxes being omitted. Fig. 5 is a horizontal sectional view of the same, showing the mechanism for operating the boxes and opening the door. Fig. 6 is a vertical sectional view, on the line 6 6 of Fig. 1, of one of the drawers. Fig. 7 is an enlarged sectional view through part of the cabinet, showing the apartment containing the scales. The dotted lines show the door opened and the scales extended. Fig. 8 is a detail view showing a corner of the board that protects the table-top. Fig. 9 is a detail sectional view showing a portion of the table-top and the said board in proximity thereto with the rubber tube interposed between them to exclude dust, insects, &c. Fig. 10 shows the bottom of the cover of the spice-compartment and the mechanism thereon for opening the door at the front thereof and stopping the box designated at the said door. Fig. 11 is a sectional view through the line $x'\ x'$, Fig. 10. Fig. 12 shows the mechanism for actuating the lever that unlocks the door to the said spice-compartment in position to hold said door unlocked. Fig. 13 is a sectional view through the line $y\ y$ of Fig. 10, showing the mechanism that unlocks the door to the spice-compartment in position to hold said door locked. Fig. 14 is a transverse sectional view of the complete device on the line $z\ z$ of Fig. 1. Fig. 15 is a detail view showing the hook for engaging the rotatable box-holder. Fig. 16 shows a rear elevation of the drawer shown in Fig. 6, showing the arrangement of the gears relative to each other.

Referring to the accompanying drawings, the reference-letter A is used to designate the frame of the cabinet proper mounted upon the casters $A^2$. Within this frame is arranged a plurality of drawers of various sizes and shapes, of which the one designated by the reference-letter $A^3$ is constructed as follows: The bottom is inclined toward the central portion, which is rounded to receive a worm $A^4$, that extends from the rear of the drawer through the front thereof, where it is encircled by a detachable cap $A^5$. At the rear of the said drawer is a gear-wheel fixed to the worm $A^4$ and meshed to a like wheel $A^6$, that is fixed to a shaft $A^7$, having a crank $A^8$ on its forward end, whereby it may be operated from the front of the drawer.

$A^9$ is a scraper-rod extended through an opening in the front.

$A^{10}$ is a support for the rear end of the rod $A^9$.

B designates a weight attached to the inner ends of two rods $B^2$ $B^2$, that have a pivotal connection with the rear end of the drawer, and $B^3$ is a rod connected with the outer ends of said rods and having an indicating-block $B^4$ attached to its upper end, said rod $B^3$ being of such a length that the block $B^4$ will appear through the glass $B^5$ when the weight B is lowered. In practical use the drawer is filled with flour or other substance and the weight B placed on top of it. Then as the flour is drawn out of the drawer the weight will gradually be lowered and the indicating-block be raised so as to be seen through the glass $B^5$. $B^6$ are protectors, made of muslin or other fabric, secured to the said rods $B^2$ and to the rear surface of the inside of the drawer to prevent dust or insects from coming through the opening in the drawer through which the rods are passed.

C designates a drawer like the one just described and having the same appliances therein.

$C^2$ and $C^3$ are drawers for the reception of kitchen utensils and the like.

D designates a drawer containing a number of compartments for holding various substances. In the present instance four compartments are shown, and I have provided each with a worm $D^2$ in its bottom, adapted, when rotated, to carry the contained substance outwardly through a spout $D^3$ at the front of the drawer. I have also provided means whereby any one of said worms may be operated from a shaft $D^4$, having a crank $D^5$ on its forward end at the front of the drawer, as follows: $D^6$ is a gear-wheel secured to the rear of the shaft $D^4$. $D^7$ are like wheels in mesh with the wheel $D^6$ and loosely mounted on the rear ends of the shafts of the worms $D^2$ and provided with clutch devices $D^8$ on their rear faces. $D^9$ are rods extended through each of the said compartments provided with knobs $D^{11}$ and connected with clutch devices $D^{10}$, that are slidingly and non-rotatably mounted on the rear ends of the shafts of each worm in proximity to the clutch devices $D^8$ thereon, so that by a movement of either of said rods the gear-wheel connected therewith will be made to rotate the shaft of the worm, when the crank $D^5$ is rotated and all of the other worms will be held stationary.

F designates a table hinged to one side of the frame A and adapted to be folded closely to the said frame. Its top is composed of two parts $F^2$ and $F^3$, the under one of which is reserved for use as a baking-board and is protected by the upper part.

$F^4$ is a rubber tube fixed to the under face of the upper part near the edges thereof to closely engage the under part and thereby produce a dust and insect proof connection between the said parts. The upper table section is hinged at the rear end to the under one, so as to be capable of being swung upwardly when the under one is used and be held in position by the latches $F^5$.

$F^6$ is a folding shelf at the opposite side of the frame A, adapted to be automatically supported in a horizontal position when raised.

$F^7$ is a bearing-block for the rod $T^5$.

H designates a compartment adapted to contain a pair of scales $H^2$. $H^3$ is a platform upon which said scales are fixed and which is mounted upon the rollers $H^4$. $H^5$ is a door at the front of said compartment hinged at its bottom to swing outwardly and provided with a cross-piece $H^6$ at its top and inner edge. $H^7$ is a coil-spring fixed to said cross-piece and to the rear of the platform $H^3$, so that when the door is opened tension will be applied to the spring to draw the platform $H^3$ outwardly until it engages the cross-piece $H^6$, when the scales will be in position for use. J designates a drawer below the scale-door that is automatically locked or released by said door $H^5$, as follows: $J^2$ is a flat flexible metal bar attached to the bottom of the scale-compartment, and $J^3$ is a lug fixed to its free end and extended downwardly through an opening into proximity to the drawer J. $J^4$ is a lug fixed to the top of said drawer and normally in engagement with the lug $J^3$ to prevent the opening of the drawer. $J^5$ is a coil-spring normally exerting its pressure upwardly upon the bar $J^2$, and $J^6$ is a lug fixed to the scale-platform to normally engage the flat metal bar $J^2$ and hold it downwardly, and as the said platform is advanced the lug $J^6$ will disengage said bar, which will be forced upwardly by the spring $J^5$ and the drawer released.

Located on top of the frame A is a frame K, containing a mirror $K^2$ and a compartment $K^3$, having a top piece $K^4$, adapted to hold a number of small boxes for spices, &c. Located within this compartment is a circular platform N, that is rotatably mounted upon the upright shaft $N^2$, and placed upon said platform are a number of boxes $N^3$, preferably wedge-shaped, to fill the space thereon. $N^4$ is a belt-wheel mounted on the upper end of said shaft $N^2$, and $N^5$ is a gear device connected with a crank $N^6$ at the front of said compartment and provided with a belt-wheel whereby it may be connected with the belt-wheel $N^4$ by a belt $N^7$ and the platform N rotated by said crank $N^6$, $N^8$ being a belt-tightener of the ordinary kind.

$N^9$ designates a circular top piece mounted on the shaft $N^2$ and provided with a number of lugs $N^{10}$ on its top face arranged with one lug directly above each box $N^3$ and at different distances from the center of the top piece $N^9$.

The top of the compartment $K^4$ is hinged at its rear end and has mechanism connected therewith, whereby any one of the boxes $N^3$ may be brought to the front and the door leading thereto be opened by a movement of the crank $N^6$.

P designates a series of rods corresponding in number to the boxes $N^3$ and provided with knobs $P^2$ on their outer ends that may be conveniently grasped.

$P^3$ are bars slidingly mounted in the top $K^4$ and arranged to be moved longitudinally at right angles to the rods P. They correspond in number with said rods and are connected with them as follows: $P^4$ designates metal plates, one of which is secured to each of the rods $P^3$ and provided with an inclined slot $P^5$, adapted to receive a pin $P^6$, connected with each of the sliding bars $P^3$, so that when any one of the rods is pulled outwardly the bar corresponding thereto will be moved at right angles thereto by means of the pin $P^6$, traveling in the inclined slot $P^5$. $P^7$ designates a flat metal bar extended at right angles to the bars $P^3$, hinged at its rear end and normally held away from the top $N^9$ by the spring $P^8$. $P^9$ is a bolt at its forward end adapted, when the said bar is in its normal position, to engage a hook $P^{10}$, that is fixed to a door $P^{11}$ in the front of said compartment and hold it closed. This bolt $P^9$ is normally held downwardly by the spring $P^{12}$, as shown in Fig. 11.

R designates wedge-shaped lugs pivotally connected with the ends of the bars $P^3$, that are in proximity to the bar $P^7$. They normally remain at one side of said bar, so that when the top piece $N^9$ is rotated the lugs $N^{10}$ will engage said lugs and elevate them and pass on; but when one of the rods P is pulled outwardly the wedge-shaped lug R, connected therewith, will be thrown under the bar $P^7$, so that the lugs R will engage said bar when the lug $N^{10}$ is brought into engagement therewith, as clearly illustrated in Figs. 11, 12, and 13. The said boxes $N^3$ are stopped (when the one corresponding to the rod P is pulled outwardly) by means of the following mechanism:

T designates a lever pivotally mounted in suitable bearings secured to the front of the compartment $K^3$ in proximity to the door $P^{11}$ with its one end adapted to engage a projection $T^2$, secured to the door. Located upon the upper end portion of the said lever is a slotted plate $T^3$, and $T^4$ is a spring whereby a yielding pressure is normally exerted to hold the lower end of the lever outwardly.

$T^5$ is a rod fixed to one side of the compartment $K^3$, provided with suitable bearings and having a hook on its outer end and passed through the slotted plate $T^3$.

$T^6$ are pins placed in the periphery of the top piece $N^9$ and adapted to be engaged by the hook on the end of the rod $T^5$ when the upper end of said rod is forced inwardly by a releasal of the door, which allows the lower end to swing outwardly, as shown in Figs. 4 and 5.

$T^8$ is a stop to limit the downward movement of the door $P^{11}$.

Having thus described the construction and function of each element and subcombination in its turn, what I claim as my invention, and desire to secure by Letters Patent of the United States therefor, is—

1. The combination with a drawer for containing flour or the like, of a worm in the bottom of the drawer, means for operating the worm, a rod fulcrumed to the side of the drawer, a float on its inner end to rest on the contents of the drawer, a rod pivoted to the outer end of the said float-bearing rod and extended vertically and an indicator on the upper end of the upright rod, substantially as and for the purposes stated.

2. In combination with a kitchen-cabinet a device having a number of boxes mounted in a rotatable frame and having means for bringing any one of said boxes to the front, comprising the following elements in combination, to wit; a rotatable platform mounted on a vertical shaft $N^2$, a number of boxes $N^3$ mounted thereon, a belt-wheel $N^4$ on said shaft, a gear device $N^5$ operated by a crank $N^6$, a belt $N^7$ for operating the said belt-wheel $N^4$ from the device $N^5$, a tension device $N^8$, a top $N^9$ on said shaft $N^2$, lugs $N^{10}$ fixed to said top, a door $P^{11}$ hinged to the front of said compartment, a catch $P^{10}$ on said door, a flat metal bar $P^7$ hinged to the top of said compartment, a bolt $P^8$ connected thereto to engage the said hook and a number of lugs R adapted to be brought into engagement with the said bar $P^7$ when engaged by the lugs $N^{10}$ to release the said door, a lever T pivotally mounted on the side of the compartment $K^3$, a projection $T^2$ secured to the door $P^{11}$, a slotted plate $T^3$ on the lever T, a spring $T^4$, a rod $T^5$ having a hook on its end pivoted to one side of the comparment and the pins $T^6$ in the edge of the top piece $N^9$, all arranged and combined substantially as and for the purposes stated.

3. In a kitchen-cabinet a drawer containing two or more compartments and means for drawing out substances from either of said compartments, by the operation of a single crank, comprising the following elements, to wit; an inclined bottom in each compartment, a worm $D^2$ therein, a gear $D^7$ loosely mounted on each worm-shaft, a shaft $D^4$ having a crank $D^5$ in its forward end and a gear-wheel $D^6$ on its rear end in mesh with the gears $D^7$, a clutch device $D^8$ fixed to each of the gears $D^7$ a rod $D^9$ running through each compartment and having clutch device $D^{10}$ connected with its end and slidingly and non-rotatably connected with the shaft of the worm $D^2$ to engage the clutch $D^8$, arranged and combined substantially in the manner set forth, for the purposes stated.

4. In a kitchen-cabinet the following elements in combination, to wit; a compartment H having a platform $H^3$ therein mounted upon the rollers $H^4$, a pair of scales $H^2$ on said platform, a door $H^5$ hinged to the front of said compartment to swing downwardly and outwardly, a cross-piece $H^6$ fixed thereto, a coil-spring $H^7$ attached to the approximate top portion of the said door and to the said platform, adapted to operate substantially in the manner set forth, for the purposes stated.

5. In a kitchen-cabinet the combination of the following elements, to wit: a compartment having a platform $H^3$ therein mounted on the rollers $H^4$ a pair of scales $H^2$ on said platform, a door $H^5$ hinged to the foot of said compartment to swing downwardly and outwardly, a cross-piece $H^6$ fixed thereto, a coil-spring $H^7$ attached to the approximate top portion of the said door and to the said platform, in combination with a drawer J having a lug $J^4$ fixed to its top, a flat flexible metal bar $J^2$ above the said drawer provided with a lug $J^3$ adapted to engage the lug $J^4$, a spring to normally exert a yielding pressure upwardly upon the part $J^2$ and a lug $J^6$ projecting downwardly from the platform $H^3$ to normally engage the part $J^2$, all arranged and combined substantially in the manner set forth, for the purposes stated.

6. In combination with a kitchen-cabinet, a device having a number of boxes mounted in a rotatable frame and having means for bringing any one of said boxes to the front, comprising the following elements in combination, to wit: a rotatable platform N mounted on a vertical shaft $N^2$ a number of boxes $N^3$ mounted thereon, a belt-wheel $N^4$ on said shaft, a gear device $N^5$ operated by a crank $N^6$ a belt $N^7$ for operating the said belt-wheel $N^4$ from the device $N^5$ a tension device $N^8$, a top $N^9$ on said shaft $N^2$ lugs $N^{10}$ fixed to said top, a door $P^{11}$ hinged to the front of said compartment, a hook $P^{10}$ on said door, a flat metal bar $P^7$ hinged to the top of said compartment, a bolt $P^9$ connected thereto to engage the said hook and a number of lugs R adapted to be brought into engagement with the said bar $P^7$ when engaged by the lugs $N^{10}$ to release the said door, means for bringing any one of said lugs into engagement with the bar $P^7$ and mechanism for engaging the rotatable box-holding frame when said door is opened, all arranged and combined substantially in the manner set forth for the purposes stated.

HARRISON LINTON.

Witnesses:
J. D. C. McFARLAND,
THOMAS G. ORWIG.